Sept. 25, 1951 A. S. PAGE 2,568,759
LIQUID OR AIR COOLED BRAKE DRUM
Filed Aug. 31, 1948
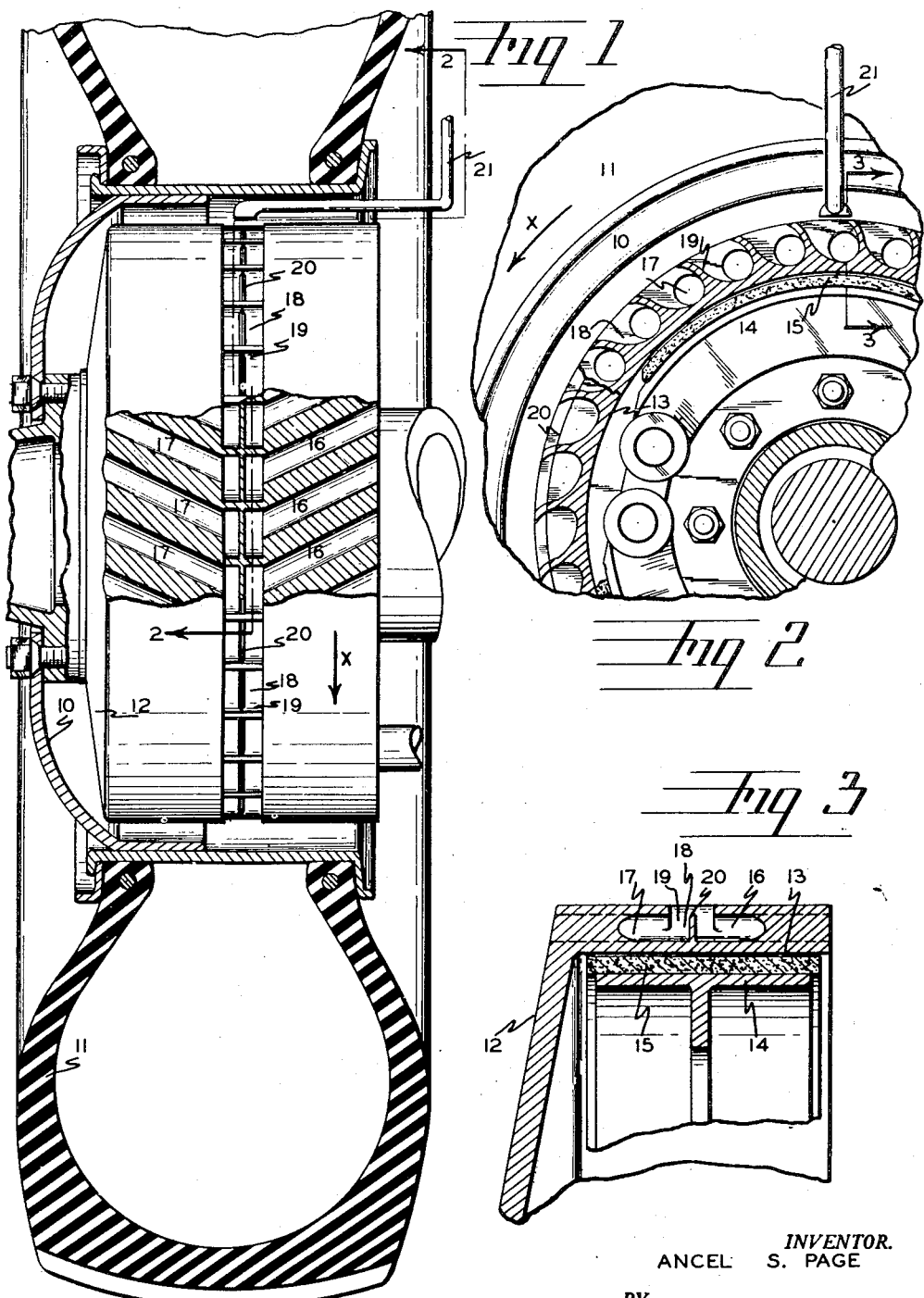
INVENTOR.
ANCEL S. PAGE
BY
ATTORNEY Patented Sept. 25, 1951

2,568,759

UNITED STATES PATENT OFFICE 2,568,759

LIQUID OR AIR COOLED BRAKE DRUM

Ancel S. Page, Portland, Oreg.

Application August 31, 1948, Serial No. 47,081

2 Claims. (Cl. 188—264)

1

This invention relates in general to cooling means for reducing the frictional heat developed in the application of braking mechanism to a rotating wheel, and, more specifically, relates to means for cooling a brake drum against which friction brake elements, such as brake shoes, are applied.

In particular, this invention relates to the cooling of a brake drum by the application of a cooling fluid to the drum and the passing of the same through the drum in such manner as to absorb frictional heat generated by the braking, and concerns especially the cooling of brake drums in motor road vehicles.

With certain types of vehicles, or vehicles used under certain conditions, the reduction of the frictional heat developed by prolonged or extensive application of the brakes becomes necessary in order to retard the otherwise rapid wearing of the brakes and the destructive effects of the generated heat. An extreme example of such condition is to be found in the case of logging trucks and trailers hauling heavy log loads down long steep grades on mountain roads. Accordingly as a result it is now customary for such vehicles to carry water tanks from which water can be delivered on to the brake drums as a means of providing some urgently needed cooling of the drums.

Merely allowing water to pass on to the brake drums, which, in brief, has been the customary method of cooling the brake drums under such conditions heretofore, is inefficient and unsatisfactory. As a result of various observations and experiments which I have made, I have found that the cooling effect produced on the drum with the application of cooling water in the manner heretofore followed is very uneven; that the maximum cooling effect from the water is by no means obtained; that there is considerable waste of water compared to the amount of cooling obtained from the water; and that it is impossible to obtain sufficient cooling of the brake drum under extensive braking by any haphazard application of cooling water to the brake drum. Furthermore the uneven cooling of a brake drum sets up thermal stresses which, under extreme circumstances, might even cause the drum to crack or break.

Accordingly the object of my invention is in general to provide for more efficient cooling of a brake drum.

Another and related object of the present invention is to provide brake drum cooling which will take place evenly over the entire drum surface.

2

A further object of my invention is to provide a water-cooled brake drum with which more efficient use of the cooling water will be insured as the water is applied to the drum.

An additional object of my invention is to provide an improved brake drum construction which may be either water cooled or air cooled and which will have channels included in the drum to facilitate the desired and proper distribution of the cooling water or cooling air, whenever the same is applied to the drum, in order to obtain the desired and necessary and even cooling of the drum.

The above indicated objects and other advantages I have been able to attain by making a brake drum with specially arranged cooling channels embodied therein, and by forming the drums and arranging its channels and otherwise carrying out my invention as hereinafter explained with reference to the accompanying drawings.

In the drawings:

Fig. 1 is an elevation of my improved brake drum and fragmentary vertical section through the vehicle wheel with which the drum is connected, a portion of the outer wall surface of the brake drum shown broken away for the purpose of showing more clearly the cooling fluid-distributing channels embodied in the drum;

Fig. 2 is a fragmentary section on line 2—2 of Fig. 1; and

Fig. 3 is a fragmentary transverse section through the drum on the vertical plane indicated by the line 3—3 of Fig. 2.

In Fig. 1 the vehicle wheel, indicated in general by the reference character 10 is of usual construction with the tire, indicated by the reference character 11, mounted thereon, and need not be described. The brake drum is mounted within the wheel in the usual manner and consists of an integral cylindrical drum having an integral, annular, inwardly-extending flange 12 on the outer end through which the drum is secured in position by bolts in the customary manner. The drum has the usual inner cylindrical braking wall surface 13 (Fig. 2) against which the brake shoes 14 with their brake lining 15 are arranged to bear when the brake force is applied, the brake shoes and related mechanism being of familiar construction and operation.

My brake drum, however, instead of being solid through, is honey-combed with a plurality of regularly spaced channels. Preferably these channels are in two identical sets 16 and 17, which channels preferably extend in opposite directions from an annular central trough 18 to the respective side rims of the drum. The central trough 18, which is open to the outer cylindrical face of the drum, as shown clearly in Fig. 1, has a series of regularly spaced, transversely-extending baffles 19. These baffles 19, instead of extending radially in the trough, preferably slope in the direction of the usual rotation of the drum and wheel, as shown in Fig. 2 (the direction of rotation being indicated by the arrows $x$ in Figs. 1 and 2). The inner faces of these baffles 19 are rounded in the trough bottom so that the baffles cause the trough 18 actually to consist of a series of cup-like pockets. Each of these cup-like pockets is furthermore divided through the middle into a pair of separate receiving pockets through a center wall or partition 20. These center walls or partitions 20 extend perpendicular to the axis of the drum and wheel. Thus the annular trough 18, extending inwardly from the outer cylindrical face of the drum, actually comprises a series of pairs of identical pockets. Each pocket of each pair constitutes an entrance into one of the channels 16 or 17 which leads through the drum to a side rim.

The channels 16 and 17, instead of being parallel to the drum axis, extend in opposite oblique directions from the central trough 18 to the respective sides or rims of the drum, and these opposite oblique directions slope away from the direction of the customary rotation of the drum.

A water tank (not shown) carrying brake drum cooling water is mounted on the vehicle in any convenient location in the customary manner. A delivery pipe 21 leads from such water tank and extends over the top of the drum in the space between the drum and the wheel, as indicated in Fig. 1. The discharging end of this water pipe 21 is centrally positioned above the trough 18 at the top of the drum in the relative position illustrated in Fig. 1.

The manner in which the desired cooling is obtained with my improved drum construction can now be briefly explained with reference to Fig. 1. As the cooling water is discharged from the pipe 21 and drops on to the rotating drum, being received at the top of the drum, the discharged water is divided by the central partitions 20. Consequently this water is delivered into each successive pair of trough pockets as these pass below the discharging end of the pipe 21. As the water is caught by the forwardly sloping baffles 19 of the rotating drum, these baffles overcome any temporary tendency for the water to bounce out of the trough pockets or to be thrown out from the drum by centrifugal force. At the same time the rotary movement of the drum causes the water in such pocket to be drawn through the connected channel 16 or 17 into which the pocket opens until the water from each pocket is finally discharged from the corresponding side rim of the drum. This passage of the water through the channels 16 or 17 causes the water to take up some of the heat from the channel walls and thus from the drum body before it is discharged from the sides of the drum.

The cooling water will thus not be discharged from the drum until it has passed along predetermined paths through the drum and performed its cooling function along these paths in the prescribed manner. Since these channels 16 and 17, and the water-receiving pockets of the central trough which lead into these channels, are regularly and closely spaced, the rotation of the drum below the discharging end of the water pipe 21 will insure a distribution of the cooling water throughout the entire drum body with the result that a fairly even cooling of the inside cylindrical surface of the drum, against which the braking force is applied, will be obtained.

Without further explanation it will now be apparent from Fig. 1 that a much more efficient and more economical use of the cooling water is obtained with my improved brake drum than is possible with any means whereby the cooling water is applied merely to the customary or unbroken cylindrical surface of a brake drum.

Thus far I have described my brake drum as being water cooled, and of course water will be the cooling medium employed in nearly all instances. However, there may be extreme occasions, for example in very low winter temperatures, when the water might freeze before it has an opportunity of coming into contact with the surfaces to be cooled. Under such conditions compressed air could be discharged into the trough 18 and the rotation of the drum would cause considerable portion of this air to be sucked through the channels 16 and 17 and discharged at the outer rims, the passage of air through the channels acting like the water to absorb heat from the walls of the channels.

It would be possible to make several modifications in the drum construction which I have illustrated and described without departing from the principle of my invention. For example, the annular trough 18, instead of being positioned in the center of the outer face of the drum, could be located at one side or the other. Similarly, instead of the two sets of channels 16 and 17, a single series of such channels extending substantially across the drum and discharging at the opposite side rim could be substituted. It would also be possible, within the scope of my invention, to change the formation of the baffles and the water-receiving pockets in the annular trough 18. In fact, my invention could be carried out with these baffles eliminated entirely in the annular trough, but I have found such baffles to be more efficient. While other minor modifications in the drum construction as illustrated will suggest themselves, and it is not my intention to limit my invention otherwise than as set forth in the claims, nevertheless, I regard the particular drum construction which I have illustrated and described as a preferred manner of carrying my invention into practice.

I claim:

1. A brake drum of the character described having an inner cylindrical face adapted to have braking means applied thereto and an outer cylindrical face, an open annular trough extending inwardly from said outer face and centrally located therein and adapted to receive a cooling liquid delivered on to said drum, a series of equally-spaced transverse vanes extending entirely across said trough and forming said trough into a succession of completely separated pockets, the top edges of said vanes lying in said outer cylindrical face of said drum, said transverse vanes sloping forwardly in the direction of normal rotation of said drum, whereby making said pockets scoop-shaped, said pockets being rounded on the bottom transversely, and a pair of drum-cooling channels of circular cross section leading from the bottom of each of said pockets through the body of the drum to the opposite sides of said drum respectively, said channels sloping obliquely from said pockets away from the direction of normal rotation of said drum, whereby liquid received into said pockets will be drawn from said pockets and through said channels by the rotation of said drum in its normal direction, the diameter of said channels being less than the spacing between said vanes forming said pockets.

2. A brake drum of the character described having an inner cylindrical face adapted to have braking means applied thereto and an outer cylindrical face, an open annular trough extending inwardly from said outer face and centrally located therein and adapted to receive a cooling liquid delivered on to said drum, a series of equally-spaced transverse vanes extending entirely across said trough and forming said trough into a succession of completely separated pockets, the top edges of said vanes not extending out beyond said outer cylindrical face of said drum, said transverse vanes sloping forwardly in the direction of normal rotation of said drum, whereby making said pockets scoop-shaped, said pockets being rounded on the bottom transversely, a pair of drum cooling channels of circular cross section leading from the bottom of said pockets through the body of said drum to the opposite sides of said drum respectively, said channels sloping obliquely from said pockets away from the direction of normal rotation of said drum, whereby liquid received into said pockets will be drawn from said pockets and through said channels by the rotation of said drum in its normal direction, the diameter of said channels being less than the spacing between said vanes forming said pockets, and a dividing partition extending centrally through each pocket in a plane perpendicular to the axis of rotation of said drum to divide the fluid being delivered into each pocket, the top edges of said dividing partitions located below the outer cylindrical face of said drum.

ANCEL S. PAGE.

REFERENCES CITED

The following references are of record in the file of this patent:

UNITED STATES PATENTS

| Number | Name | Date |
|---|---|---|
| 1,137,939 | Wern | May 4, 1915 |
| 1,159,502 | King et al. | Nov. 9, 1915 |
| 1,636,040 | Boykin | July 19, 1927 |
| 1,881,002 | Udale | Oct. 4, 1932 |

FOREIGN PATENTS

| Number | Country | Date |
|---|---|---|
| 7,862 of 1927 | Australia | Oct. 25, 1927 |
| 338,237 | Germany | July 18, 1921 |
| 481,521 | Germany | Aug. 1, 1929 |